United States Patent
Levit et al.

(10) Patent No.: US 7,551,599 B2
(45) Date of Patent: Jun. 23, 2009

(54) LAYER-3 NETWORK ROUTING WITH RPR LAYER-2 VISIBILITY

(75) Inventors: Alex Levit, Ramat-Gan (IL); Gideon Agmon, Kfar-Sava (IL); Ronen Solomon, Givatayim (IL); Zvika Menahemi, Modi'in (IL)

(73) Assignee: Corrigent Systems Ltd., Tel Aviv (IL)

( * ) Notice: Subject to any disclaimer, the term of this patent is extended or adjusted under 35 U.S.C. 154(b) by 1131 days.

(21) Appl. No.: 10/812,321

(22) Filed: Mar. 29, 2004

(65) Prior Publication Data

US 2005/0213558 A1 Sep. 29, 2005

(51) Int. Cl.
*H04L 12/28* (2006.01)

(52) U.S. Cl. ................................. 370/351; 370/254

(58) Field of Classification Search .............. 370/351, 370/419, 223, 392, 254, 222, 238, 405, 406, 370/221, 230, 255, 401; 709/238, 227, 201, 709/239, 242, 224, 223; 705/1, 10
See application file for complete search history.

(56) References Cited

U.S. PATENT DOCUMENTS

| | | | |
|---|---|---|---|
| 3,411,507 A | 11/1968 | Wingrove | |
| 4,535,785 A | 8/1985 | Van den Honert et al. | |
| 4,573,481 A | 3/1986 | Bullara | |
| 4,602,624 A | 7/1986 | Naples et al. | |
| 4,608,985 A | 9/1986 | Crish et al. | |
| 4,628,942 A | 12/1986 | Sweeney et al. | |
| 4,649,936 A | 3/1987 | Ungar et al. | |
| 4,702,254 A | 10/1987 | Zabara | |
| 4,739,764 A | 4/1988 | Lue et al. | |
| 4,867,164 A | 9/1989 | Zabara | |
| 4,962,751 A | 10/1990 | Krauter | |
| 5,025,807 A | 6/1991 | Zabara | |

(Continued)

FOREIGN PATENT DOCUMENTS

WO   WO 01/10375   2/2001

OTHER PUBLICATIONS

Moy, "OSPF", Version 2, published as Request for Comments (RFC) 2328 of the Internet Engineering Task Force (IETF) Network Working Group, Apr. 1998.

(Continued)

*Primary Examiner*—Wing F Chan
*Assistant Examiner*—Prenell P Jones
(74) *Attorney, Agent, or Firm*—Husch Blackwell Sanders LLP Welsh & Katz

(57) ABSTRACT

Routing tables of OSI layer-3 network elements are modified in order to enable entry to a RPR subnet at different entry points. This enables virtual tunnels or routing paths to utilize all existing entry links to the RPR subnet and to minimize cost factors, such as the number of RPR spans required to traverse the RPR subnet from the entry point to a destination RPR node. The routing tables of RPR subnet elements are modified, such that traffic leaving different elements but destined for the same network location outside the RPR subnet may have individualized RPR exit nodes. The respective RPR exit points for the network elements are chosen to minimize cost factors, such as the number of RPR spans required to reach the exit node from each RPR node.

84 Claims, 2 Drawing Sheets

U.S. PATENT DOCUMENTS

| | | | |
|---|---|---|---|
| 5,188,104 | A | 2/1993 | Wernicke et al. |
| 5,199,430 | A | 4/1993 | Fang et al. |
| 5,205,285 | A | 4/1993 | Baker, Jr. |
| 5,215,086 | A | 6/1993 | Terry, Jr. et al. |
| 5,263,480 | A | 11/1993 | Wernicke et al. |
| 5,282,468 | A | 2/1994 | Klepinski |
| 5,292,344 | A | 3/1994 | Douglas |
| 5,299,569 | A | 4/1994 | Wernicke et al. |
| 5,335,657 | A | 8/1994 | Terry, Jr. et al. |
| 5,423,872 | A | 6/1995 | Cigaina |
| 5,540,730 | A | 7/1996 | Terry, Jr. et al. |
| 5,540,734 | A | 7/1996 | Zabara |
| 5,571,150 | A | 11/1996 | Wernicke et al. |
| 5,690,691 | A | 11/1997 | Chen et al. |
| 5,707,400 | A | 1/1998 | Terry, Jr. et al. |
| 5,716,385 | A | 2/1998 | Mittal et al. |
| 5,755,750 | A | 5/1998 | Petruska et al. |
| 5,836,994 | A | 11/1998 | Bougeois |
| 6,026,326 | A | 2/2000 | Bardy |
| 6,083,249 | A | 7/2000 | Familoni |
| 6,091,992 | A | 7/2000 | Bourgeois et al. |
| 6,097,984 | A | 8/2000 | Douglas |
| 6,104,955 | A | 8/2000 | Bourgeois |
| 6,205,359 | B1 | 3/2001 | Boveja |
| 6,205,488 | B1 | 3/2001 | Casey et al. |
| 6,275,493 | B1 | 8/2001 | Morris et al. |
| 6,304,575 | B1 | 10/2001 | Carroll et al. |
| 6,314,110 | B1 | 11/2001 | Chin et al. |
| 6,466,985 | B1 | 10/2002 | Goyal et al. |
| 6,507,577 | B1 | 1/2003 | Mauger et al. |
| 6,510,141 | B1 | 1/2003 | Ramfelt et al. |
| 6,522,627 | B1 | 2/2003 | Mauger |
| 6,604,136 | B1 | 8/2003 | Chang et al. |
| 6,628,624 | B1 | 9/2003 | Mahajan et al. |
| 6,760,775 | B1 | 7/2004 | Anerousis et al. |
| 6,765,921 | B1 | 7/2004 | Stacey et al. |
| 6,778,494 | B1 | 8/2004 | Mauger |
| 6,778,496 | B1 | 8/2004 | Meempat et al. |
| 6,886,043 | B1 | 4/2005 | Mauger et al. |
| 6,952,395 | B1 | 10/2005 | Manoharan et al. |
| 6,952,397 | B2 | 10/2005 | Mor et al. |
| 6,956,820 | B2 * | 10/2005 | Zhu et al. ............... 370/230.1 |
| 6,992,975 | B1 | 1/2006 | Daniel et al. |
| 7,035,279 | B2 | 4/2006 | Bruckman |
| 7,042,846 | B2 | 5/2006 | Bauer |
| 7,161,899 | B2 | 1/2007 | Limaye et al. |
| 7,180,887 | B1 * | 2/2007 | Schwaderer et al. ........ 370/351 |
| 7,197,008 | B1 | 3/2007 | Shabtay et al. |
| 7,212,490 | B1 | 5/2007 | Kao et al. |
| 7,260,097 | B2 | 8/2007 | Casey |
| 7,483,399 | B2 * | 1/2009 | Zelig et al. ................. 370/258 |
| 2001/0032271 | A1 | 10/2001 | Allen |
| 2002/0024974 | A1 | 2/2002 | Karagiannis et al. |
| 2002/0118700 | A1 | 8/2002 | Bruckman |
| 2002/0176371 | A1 | 11/2002 | Behzadi |
| 2002/0176450 | A1 | 11/2002 | Kong et al. |
| 2003/0009594 | A1 | 1/2003 | McElligott |
| 2003/0074469 | A1 | 4/2003 | Busi et al. |
| 2003/0103449 | A1 | 6/2003 | Barsheshet et al. |
| 2003/0118041 | A1 * | 6/2003 | Fontana et al. ............. 370/404 |
| 2003/0147345 | A1 | 8/2003 | Takagi et al. |
| 2003/0147352 | A1 | 8/2003 | Ishibashi et al. |
| 2003/0152025 | A1 | 8/2003 | Anderson et al. |
| 2003/0154315 | A1 | 8/2003 | Sultan et al. |
| 2003/0185217 | A1 | 10/2003 | Ganti et al. |
| 2003/0227919 | A1 * | 12/2003 | Zelig et al. ................. 370/392 |
| 2004/0022268 | A1 | 2/2004 | Busi et al. |
| 2004/0109408 | A1 * | 6/2004 | Mesh et al. ................. 370/222 |
| 2004/0170184 | A1 | 9/2004 | Hashimoto |
| 2004/0202171 | A1 | 10/2004 | Hama |
| 2004/0208554 | A1 | 10/2004 | Wakai et al. |
| 2005/0010685 | A1 | 1/2005 | Ramnath et al. |
| 2005/0226265 | A1 * | 10/2005 | Takatori .................... 370/452 |
| 2005/0249233 | A1 * | 11/2005 | Akaba et al. ............... 370/432 |
| 2006/0109802 | A1 * | 5/2006 | Zelig et al. ................. 370/258 |
| 2007/0268821 | A1 * | 11/2007 | Levit et al. ................. 370/223 |
| 2007/0268915 | A1 * | 11/2007 | Zelig et al. ................. 370/401 |

OTHER PUBLICATIONS

Herrera, et al., "A Framework for IP over Packet Transport Rings", (Internet Draft, draft-ietf-iporprframework-00).

Rosen, et al., in Request for Comments (RFC) 3031 of the Internet Engineering Task Force (IETF), entitled: "Multiprotocol Label Switching Architecture", Jan. 2001. (Available at: www.ietf.org/rfc/html).

D. Tsiang et al., Request for Comments (RFC) Draft Entitled: "Encapsulation Methods for transport of layer 2 Frames over MPLS", May 2001. (Available at: search.ietf.org/internet-drafts/draft-martini-12circuit-emcap-mpls-02.txt).

Martine, et al., in an IETF Draft Entitled: "Encapsulation Methods for transport of layer 2 Frames over MPLS", May 2001. (Available at: search.ietf.org/internet-drafts/draft-martine-12circuit-encap-mpls-02.txt.).

Martini, et al., Internet Draft, entitled: "Transport of Layer 2 Frames over MPLS", May 2001. (Available at: search.ietf.org/internet-drafts/draft-martini-12circuit-mpls-06.txt.).

Malkin, G., "RIP Version 2", RFC 2453, Nov. 1998, pp. 1-39.

Finlayson, R. et al., "A Reverse Address Resolution Protocol", RFC 903, Jun. 1984, pp. 1-5.

Bradley, et al., in IETF RFC 1490, "Multiprotocol Interconnect over Frame Relay", Jul. 1993.

Baker, et al., in IETF RFC 1638, "PPP Bridging Control Protocol (BCP)", Jun. 1994.

Christensen, in IETF draft "MPLS Multicast over Ethernet" (draft-jagd-mpls-mcast-eth-00.text, 2001).

Mamakos, et al, "A Method for Transmitting PPP Over Ethernet (PPPoE)", in IETF RFC 2516, Feb. 1999.

Sajassi, et al., "L2VPN Interworking" (draft-sajassi-12vpn-interworking-01.txt, Mar. 2003).

Marc Lasserre, et al., "Virtual Private LAN Services Over MPLS" (draft-laserre-vkompella-ppvpn-vpls-01.txt), Sep. 2002.

Deering, RFC 1112, "Host Extensions for IP Multicasting", Aug. 1989.

T. Senevirathne, "Virtual pirvate LAN Service (VPLS) Solution Using GRE Based IP Tunnels", (draft-tsenevir-gre-vpls-00.txt), Feb. 2002.

Prayson Pate, et al., "Framework for Pseudo wire Emulation Edge-to-Edge (PWSE3)", (draft-ietf-pwe3-fraemwork-01.txt), Jun. 2002.

W. Augustyn, et al., "Requirements for Virtual Private LAN Services" (draft-datz-yeung-pspf-traffic-06.txt), Oct. 2001.

Katz, et al., "Traffic Engineering Extension ot OSPF", (draft-katz-yeung-ospf-traffic-0t.txt), Oct. 2001.

Li, et al., "IS-IS Extensions For Traffic Engineering", (published as draft-ietf-isis-traffic-04.txt), Aug. 2001.

Plummer, D., "An Ethernet address Resolution Protocol", RFC 826, Nov. 1982, pp. 1-9.

\* cited by examiner

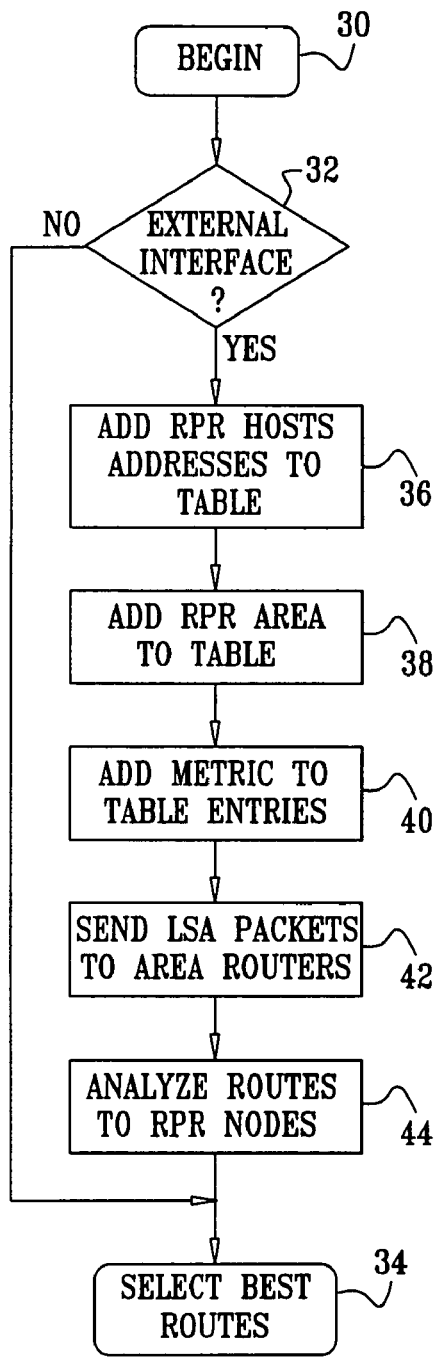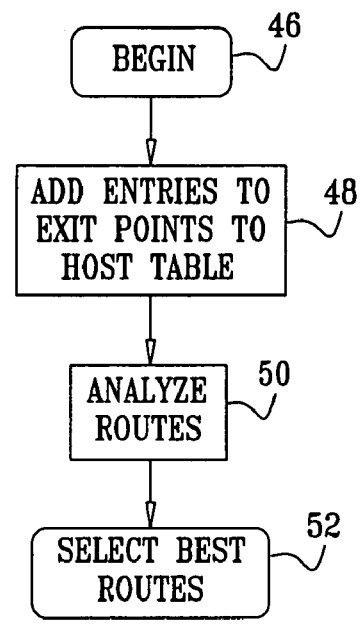

LAYER-3 NETWORK ROUTING WITH RPR LAYER-2 VISIBILITY

BACKGROUND OF THE INVENTION

1. Field of the Invention

This invention relates to communications networks. More particularly, this invention relates to methods and systems for improved utilization of communications networks configured as layer-2 ring networks.

2. Description of the Related Art

The meanings of acronyms and certain terminology used herein are given in Table 1.

TABLE 1

| | |
|---|---|
| AS | Autonomous System |
| ATM | Asynchronous Transfer Mode. A network technology based on transferring data in cells or packets of a fixed size. |
| FEC | Forwarding equivalence class |
| HDLC | High-level Data Link Control |
| IETF | Internet engineering task force |
| IGP | Interior Gateway Protocol |
| IP | Internet protocol |
| LAN | Local Area Network |
| LDP | Label distribution protocol |
| LLC | Logical link congtrol |
| LSA | Link state advertisement |
| LSP | Label-switched path |
| LSR | Label-switching router |
| MAC | Media access control |
| MPLS | Multi-protocol label switching |
| MPLS-TE | MPLS traffic engineering |
| OSI | Open System Interconnection. A networking framework for implementing protocols. |
| OSPF | Open Shortest path First. A routing protocol |
| OSPF-TE | OSPF enhancements used in traffic engineering |
| RFC | Request for comments |
| RIP | Routing information protocol |
| RPR | Resilient packet rings - a protocol |
| RSVP | Resource reservation protocol |
| RSVP-TE | An extension of RSVP, used in traffic engineering |
| SRP | Spatial reuse protocol |
| TE | Traffic engineering |
| TLV | Type-Length-Value. An encoding scheme |

Local Area Networks (LAN's) connect computing systems together. LAN's of all types can be connected together using Media Access Control (MAC) bridges, as set forth in the "IEEE Standard for Information Technology, Telecommunications and Information Exchange between Systems, Local and Metropolitan Area Networks, Common Specifications, Part 3: Media Access Control (MAC) Bridges," published as ANSI/IEEE Standard 802.1D (1998). The 802.1D standard is available via the Internet at the URL standards.ieee.org/catalog/IEEE802.1.html.

Data networks, including LAN's, are commonly conceptualized as a hierarchy of layers according to the Open System Interconnection Model (OSI). OSI defines a networking framework for implementing protocols in seven layers, of which layer-3 (network layer), and layer-2 (data link layer) are relevant to the instant invention.

Implementation of layer-3 requires high level knowledge of the network organization, and access to router tables that indicate where to forward or send data. This layer provides high level switching and routing technologies, and creates logical paths, known as virtual circuits, for transmitting data from node to node. In layer-3, data is transmitted by creating a frame that usually contains source and destination network addresses.

Layer-2 encapsulates the layer-3 frame, adding more detailed data link control information to form a new, larger frame. Layer-2 implements a transmission protocol and handles flow control, frame synchronization, and handles errors arising in the physical layer (layer-1). Layer-2 is divided into two sublayers: a media access control (MAC) sublayer and a logical link control (LLC) sublayer. The MAC sublayer controls how a computer on the network gains access to the data and its permission to transmit the data. The LLC layer controls frame synchronization, flow control and error checking.

HDLC (High-level Data Link Control) is a related term that refers to a group of layer-2 protocols or rules for transmitting data between network points, known as nodes. In HDLC, data is organized into frames and sent across a network to a destination that verifies its successful arrival. The HDLC protocol also manages the flow or pacing at which data is sent.

The Open Shortest Path First (OSPF) protocol is a link-state layer-3 routing protocol used for Internet routing. OSPF is described in detail by Moy in OSPF Version 2, published as Request for Comments (RFC) 2328 of the Internet Engineering Task Force (IETF) Network Working Group (April, 1998), which is incorporated herein by reference. This document is available at www.ietf.org, as are the other IETF RFC and draft documents mentioned below. OSPF is used by a group of Internet Protocol (IP) routers in an Autonomous System (AS) to exchange information regarding the system topology. The term "Autonomous System" denotes a group of routers exchanging routing information via a common routing protocol. Each OSPF router maintains an identical topology database, with exceptions as noted below. Based on this database, the routers calculate their routing tables by constructing a shortest-path tree to each of the other routers.

Each individual piece of the topology database maintained by the OSPF routers describes the "local state" of a particular router in the Autonomous System. This local state includes information such as the router's usable interfaces and reachable neighbors. The routers distribute their local state information by transmitting a link state advertisement (LSA). Packets containing link state advertisements are flooded throughout the routing domain. The other routers receive these packets and use the LSA information to build and update their databases.

OSPF allows collections of contiguous networks and hosts to be grouped together to form an OSPF area. An OSPF area includes routers having interfaces to any one of the grouped networks. Each area runs a separate copy of the basic link-state routing algorithm. The topology of an OSPF area is invisible from outside of the area. Conversely, routers internal to a given area does not know the detailed topology external to the area. This isolation of knowledge results in a marked reduction in routing traffic, as compared to treating the entire Autonomous System as a single link-state domain. A router in an Autonomous System has a separate topological database for each area to which it is connected. Routers connected to multiple areas are called area border routers. However, routers belonging to the same area have, for that area, identical area topological databases.

An OSPF LSA database allows a layer-3 aware network element, such as a router, to build its routing table by running the well-known SPF algorithm. The element then routes IP packets based on the actual routing table and on the destination IP address in the IP packet header. A cost is associated with the output side of each router interface, and is used by the router in choosing the least costly path for the packets. This cost is configurable by the system administrator. The lower the cost, the more likely the interface is to be used to forward data traffic. For the purposes of cost calculation and routing, OSPF recognizes two types of networks (which may be organized as IP networks, subnets or supernets): point-to-point networks, which connect a single pair of routers; and multi-access networks, supporting two or more attached routers. Each pair of routers on a multi-access network is assumed to be able to intercommunicate directly. An Ethernet is an example of a multi-access network. Each multi-access network includes a "designated router," which is responsible for flooding LSA's over the network, as well as certain other protocol functions. Further details concerning network cost calculation and routing are disclosed in application Ser. No. 10/211,066, (Publication No. 20030103449), which is commonly assigned herewith, and herein incorporated by reference.

Multi-access layer-2 networks may be configured internally as rings. The leading bi-directional protocol for layer-2 high-speed packet rings is the Resilient Packet Rings (RPR) protocol, which is in the process of being defined as IEEE standard 802.17. Network-layer-routing over RPR is described, for example, by Jogalekar et al., in IP over Resilient Packet Rings (Internet Draft draft-jogalekar-iporpr-00), and by Herrera et al., in A Framework for IP over Packet Transport Rings (Internet Draft draft-ietf-ipoptr-framework-00). A proposed solution for media access control (MAC protocol layer-2) in bi-directional ring networks is the Spatial Reuse Protocol (SRP), which is described by Tsiang et al., in the IETF document RFC-2892, entitled *The Cisco SRP MAC Layer Protocol*. Using protocols such as these, each node in a ring network can communicate directly with all other nodes through either an inner or an outer ring, using the appropriate Media Access Control (MAC) addresses of the nodes. The terms "inner" and "outer" are used arbitrarily herein to distinguish the different ring traffic directions. These terms have no physical meaning with respect to the actual configuration of the network.

Multiprotocol Label Switching (MPLS) is gaining popularity as a method for efficient transportation of data packets over connectionless networks, such as Internet Protocol (IP) networks. MPLS is described in detail by Rosen et al., in Request for Comments (RFC) 3031 of the Internet Engineering Task Force (IETF), entitled "Multiprotocol Label Switching Architecture" (January, 2001). In conventional IP routing, each router along the path of a packet sent through the network analyzes the packet header and independently chooses the next hop for the packet by running a routing algorithm. In MPLS, however, each packet is assigned to a Forwarding Equivalence Class (FEC) when it enters the network, depending on its destination address. The packet receives a short, fixed-length label identifying the FEC to which it belongs. All packets in a given FEC are passed through the network over the same path by label-switching routers (LSR's). Unlike IP routers, LSR's simply use the packet label as an index to a look-up table, which specifies the next hop on the path for each FEC and the label that the LSR should attach to the packet for the next hop.

Since the flow of packets along a label-switched path (LSP) under MPLS is completely specified by the label applied at the ingress node of the path, a LSP can be treated as a tunnel through the network. Such tunnels are particularly useful in network traffic engineering, as well as communication security. MPLS tunnels are established by "binding" a particular label, which is assigned at the ingress node to the network, to a particular FEC.

Currently, layer-3 routing protocols, such as RIP and OSPF, are unaware of the topology of layer-2 RPR networks with which they must interact. A routing table allows the router to forward packets from source to destination via the most suitable path, i.e., lowest cost, minimum number of hops. The routing table is updated via the routing protocol, which dynamically discovers currently available paths. The routing table may also be updated via static routes, or can be built using a local interface configuration, which is updated by the network administrator. However, the RPR ingress and egress nodes chosen in the operation of automatic routing protocols do not take into account the internal links within the RPR ring, and may therefore cause load imbalances within the RPR subnet, which generally results in suboptimum performance of the larger network.

SUMMARY OF THE INVENTION

According to a disclosed embodiment of the invention, methods and systems are provided for the manipulation of layer-3 network nodes, external routers, routing tables and elements of layer-2 ring networks, such as RPR networks, enabling the layer-3 elements to view the topology of a layer-2 ring subnet. This feature permits routers to choose optimal entry points to the layer-2 subnet for different routes that pass into or through the layer-2 subnet. This enables virtual tunnels or routing paths to utilize all existing entry links to the subnet and to minimize cost factors, such as the number of spans required to traverse the subnet from the entry point to a destination node of the subnet.

In an aspect of the invention, the routing tables of RPR subnet elements are manipulated such that traffic routes originating in or passing through different elements of the RPR subnet and destined for network locations outside the RPR ring have individualized exit nodes. The exit points for the different routes are chosen to minimize cost factors, such as the number of spans required to reach the exit node from each node of the layer-2 subnet.

The invention provides a method for obtaining ingress to a layer-2 ring network to reach nodes thereof, the nodes including ingress nodes that couple the ring network to an external layer-3 network, which is carried out in the ingress nodes by creating entries in a host table, each of the entries including an address of a respective one of the nodes of the ring network and a metric that is determined responsively to a topology of the ring network. Thereafter, the method is further carried out by uploading the host table to external elements of the layer-3 network, defining paths from the external elements to designated ones of the nodes of the ring network by selecting one of the ingress nodes for each of the paths responsively to the metric, and transmitting data from network elements that are external to the ring network to at least one of the nodes via a selected one of the paths.

According to an aspect of the method, the ring network is a RPR subnet.

According to an additional aspect of the method, the ingress nodes are selected responsively to a minimum value of the metric.

According to another aspect of the method, the ingress nodes are selected responsively to a maximum value of the metric.

In an additional aspect of the method, paths are defined in one or more of the external elements. The paths may be virtual tunnels.

In one aspect of the method, the layer-3 network is an IP network, and uploading is achieved by flooding router LSA's with a mask, which can be a 32-bit mask.

In another aspect of the method stub networks are flooded to achieve uploading.

One aspect of the method uploading is performed by external LSA advertising to the layer-3 network.

According to another aspect of the method, the metric includes a cost factor that is computed between one of the ingress nodes and the respective one of the nodes.

According to yet another aspect of the method, the cost factor varies with a number of layer-2 spans between the one ingress node and the respective one of the nodes.

In another aspect of the method paths are defined by computing a total cost based on the cost factor and on interface costs that are assigned in the layer-3 network, and selecting the paths so as to minimize the total cost.

According to a further aspect of the method, the metric is determined responsively to a number of hops between the ingress nodes and the respective one of the nodes.

According to another aspect of the method, the ingress nodes are configured with an interface cost on the layer-3 network, and the metric is determined proportionally to the interface cost and to the number of hops.

According to a further aspect of the method, the ingress nodes are configured with an interface cost on the layer-3 network, and the metric is determined by the interface cost divided by the number of hops.

The invention provides a computer software product, including a computer-readable medium in which computer program instructions are stored, which instructions, when read by a computer, cause the computer to perform a method for obtaining ingress from an external layer-3 network to a layer-2 ring network to reach nodes thereof, which is carried out by configuring ingress nodes of the ring network to create entries in a host table, each of the entries including an address of a respective one of the nodes of the ring network and a metric. The method is further carried out by configuring the ingress nodes to thereafter upload the host table to external elements of a data network that interfaces with the ring network via the ingress nodes, configuring the external elements to define paths from the external elements to designated ones of the nodes of the ring network, each of the paths leading through a selected one of the ingress nodes responsively to the metric, and transmitting data from network elements that are external to the ring network to at least one of the nodes via a selected one of the paths.

The invention provides a network routing system for obtaining ingress from an external layer-3 network to a layer-2 ring network to reach nodes thereof, including first routers disposed in ingress nodes of the ring network. The first routers are adapted for creating entries in a host table, each of the entries including an address of a respective one of the nodes of the ring network and a metric. The first routers are further adapted for uploading the host table to external elements of a data network that interfaces with the ring network via the ingress nodes. A second router is disposed in at least one of the external elements. The second router is adapted for defining paths from the external elements to designated ones of the nodes of the ring network, each of the paths leading through a selected one of the ingress nodes responsively to the metric, and transmitting data from network elements that are external to the ring network to at least one of the nodes via a selected one of the paths.

The invention provides a method for obtaining egress from a layer-2 ring network to an external layer-3 network, which is carried out in nodes of the ring network by creating entries in a host table, each of the entries including an address of a respective one of the nodes of the ring network, and a metric determined responsively to a topology of the ring network. The method is further carried out by defining paths from the nodes through egress nodes of the ring network to external elements in the external layer-3 network, selecting one of the paths responsively to the metric, and transmitting data from at least one of the nodes via the selected one of the paths to network elements that are external to the ring network.

The invention provides a computer software product, including a computer-readable medium in which computer program instructions are stored, which instructions, when read by a computer, cause the computer to perform a method for obtaining egress from a layer-2 ring network to an external layer-3 network, which is carried out in nodes of the ring network by creating entries in a host table, each of the entries including an address of a respective one of the nodes of the ring network and a metric. The method is further carried out by defining paths from the nodes through egress nodes of the ring network, selecting one of the paths responsively to the metric, and transmitting data from the nodes via the selected paths to network elements that are external to the ring network.

The invention provides a network routing system for obtaining egress from a layer-2 ring network to an external layer-3 network, including a plurality of routers disposed in nodes of the ring network. The routers are adapted for creating entries in a host table, each of the entries including an address of a respective one of the nodes of the ring network and a metric. The routers are further adapted for defining paths from the nodes through egress nodes of the ring network, for selecting one of the paths responsively to the metric, and for transmitting data from the nodes via the selected paths to network elements that are external to the ring network.

The invention provides a method for routing data through a layer-2 ring network, the ring network having interface nodes with external network elements of a data network and non-interface nodes, which is carried out in the interface nodes of the ring network by creating first entries in a first host table, each of the first entries including an address of a respective one of the non-interface nodes and a first metric. The method is further carried out by thereafter uploading the first host table to the external network elements, and using the first host table to identify optimum ingress paths from the external network elements to the non-interface nodes, each of the ingress paths leading through one of the interface nodes responsively to the first metric. The method is further carried out in the non-interface nodes of the ring network by creating second entries in a second host table, each of the second entries including an address of a respective one of the interface nodes and a second metric, using the second host table to identify optimum egress paths from the non-interface nodes through different ones of the interface nodes of the ring network responsively to the second metric, and transmitting data to and from the ring network via the ingress paths and the egress paths.

BRIEF DESCRIPTION OF THE DRAWINGS

For a better understanding of the present invention, reference is made to the detailed description of the invention, by way of example, which is to be read in conjunction with the following drawings, wherein like elements are given like reference numerals, and wherein:

FIG. 2 is a flow diagram illustrating a method of obtaining ingress to a layer-2 subnet from a layer-3 network at different entry points in accordance with a disclosed embodiment of the invention; and FIG. 3 is a flow diagram illustrating a method of obtaining egress from a layer-2 subnet into a layer-3 network at different exit points in accordance with a disclosed embodiment of the invention.

DETAILED DESCRIPTION OF THE INVENTION

Figure 1:
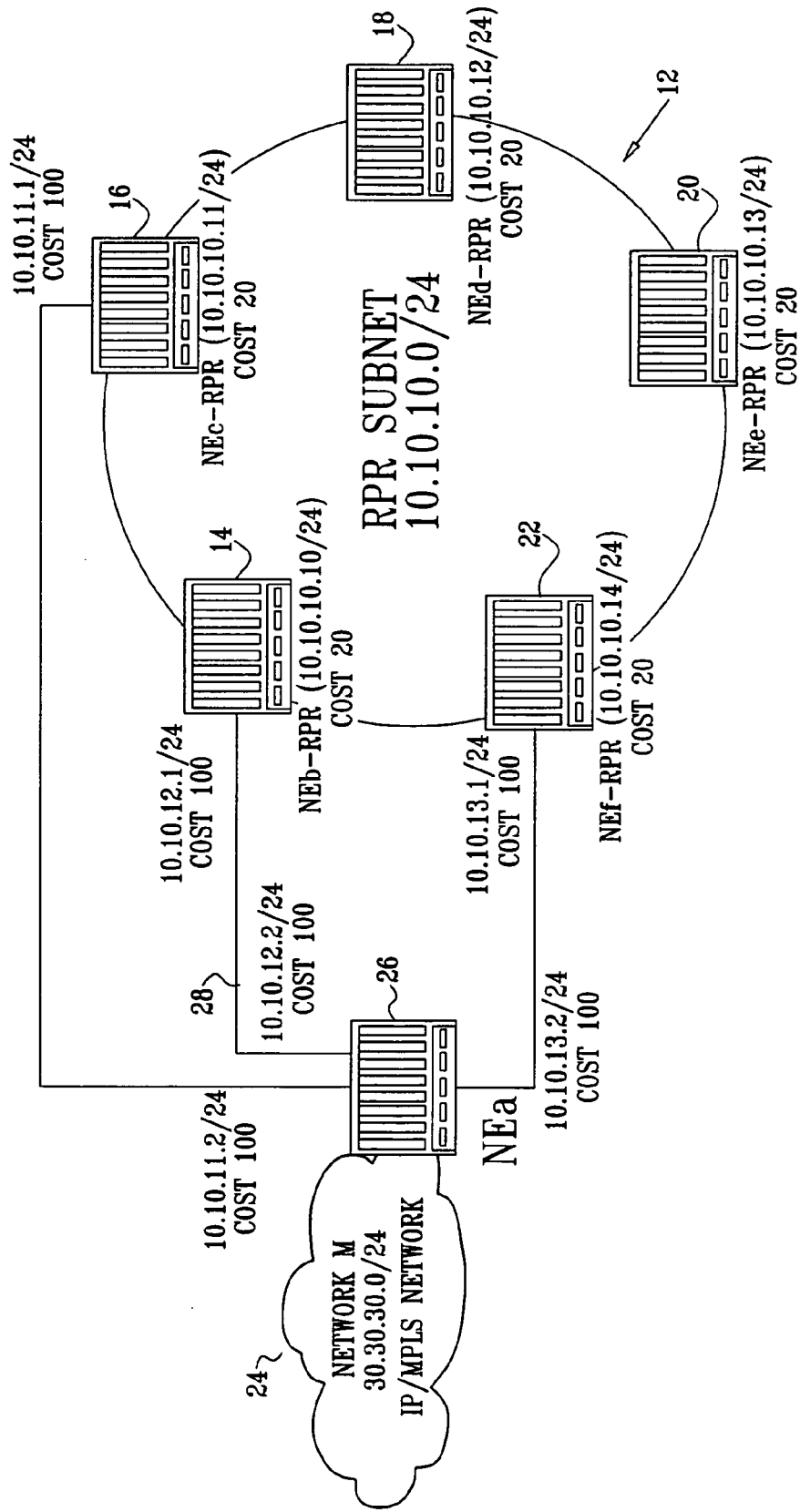
FIG. 1 is a schematic diagram illustrating a portion of a data network, which is operative in accordance with a disclosed embodiment of the invention.

In the following description, numerous specific details are set forth in order to provide a thorough understanding of the present invention. It will be apparent to one skilled in the art, however, that the present invention may be practiced without these specific details. In other instances well-known circuits, control logic, and the details of computer program instructions for conventional algorithms and processes have not been shown in detail in order not to unnecessarily obscure the present invention.

Software programming code, which embodies aspects of the present invention, is typically maintained in permanent storage, such as a computer readable medium. In a client-server environment, such software programming code may be stored on a client or a server. The software programming code may be embodied on any of a variety of known media for use with a data processing system. This includes, but is not limited to, magnetic and optical storage devices such as disk drives, magnetic tape, compact discs (CD's), digital video discs (DVD's). In addition, while the invention may be embodied in computer software, the functions necessary to implement the invention may alternatively be embodied in part or in whole using hardware components such as application-specific integrated circuits or other hardware, or some combination of hardware components and software.

Overview.

Turning now to the drawings, reference is initially made to FIG. 1, which is a schematic diagram illustrating a portion of a data network 10, which is operative in accordance with a disclosed embodiment of the invention. The data network 10 has a RPR subnet 12 formed of RPR nodes 14, 16, 18, 20, 22. The RPR nodes 14, 16, 22 are interface nodes, interfacing with an external layer-3 network 24, which is typically an IP-aware network, and which may also have MPLS functions. The RPR nodes 18, 20 are non-interface nodes. Although five RPR nodes are shown representatively in FIG. 1, the invention can be practiced with other layer-2 subnets comprising any number of nodes. The data network 10 also has an external IP/MPLS node 26. The exemplary network 24 (30.30.30.0/24) is applicable to a method of choosing the exit point form each RPR network element, as is disclosed in further detail hereinbelow.

Routers in the network 10, such as a router at the IP/MPLS node 26, build routing tables, each containing routing entries for specific destination networks and the specification of a hop to the next router along the path to the destination network. Table 2 is an example of such an entry. The destination in Table 2 is shown as a network address. This means that all IP packets to all hosts (in this case the RPR nodes 14, 16, 18, 20, 22) within the RPR subnet 12 (10.10.10.0) flow through the same path.

TABLE 2

| Destination network | Destination mask | Next hop IP | Cost to destination |
|---|---|---|---|
| 10.10.10.0 | 255.255.255.0 | 10.10.12.1 | 120 |

There are signaling protocols known in the art, such as RSPV-TE or LDP, which use the routing table to create virtual tunnels in the data network 10 with pre-defined reserved bandwidth along the routing path. These tunnels might be provisioned to use dynamic routes, as specified by the routing protocol, i.e., routes that are configured automatically (i.e., dynamically path-routed according to the IGP route) by the routers based on factors such as cost parameters assigned to different links. Protocols for route discovery are known as interior gateway protocols (IGP), such as OSPF, RIP, IS-IS. When different routes to the same destination have the same cost, the routers choose one of the routes arbitrarily, according to some predefined criterion. In a multi-access subnet, such as the RPR subnet 12 shown in FIG. 1, all nodes are configured to have the same cost (20). Therefore, the IP/MPLS node 26 would configure its routing database to point to the RPR subnet 12 (the destination network 10.10.10.0/24) via a single computed minimum cost next hop. Consequently, all signaled label-switched paths would always flow into the RPR subnet 12 via one, and only one, ring entry point.

As mentioned above, layer-3 protocols, such as OSPF are unaware of the layer-2 RPR ring topology with multiple segments between two adjacent nodes. OSPF update dynamically updates the routing table of external routers, such as the IP/MPLS node 26, so as to route packets to the RPR subnet 12 via a single entry point based on minimum cost. In FIG. 1 the available entry points, RPR nodes 14, 16, 22, have identical costs of 100. The RPR node 14 (10.10.12.1) could be chosen as the entry point to the RPR subnet 12 arbitrarily. OSPF builds a topology database at the IP/MPLS node 26, and constructs an entry in the routing table, specifying routing to the RPR subnet 12 (10.10.10.0/24) via a next hop through the RPR node 14 (10.10.12.1) with a cost 120 (100+20). In this case since the IGP route specifies that all IP packets designated to the RPR subnet should flow through the address 10.10.12.1, any IP RSVP-TE path message packet that is configured to use a dynamic route will flow through this interface. Thus, all signaled LSP, i.e., MPLS tunnels, extending from the IP/MPLS node 26 (NEa) or other network elements within the MPLS "cloud", to the RPR nodes 14, 16, 18, 20, 22 (NEb, NEc, NEd, NEe and NEf) will flow through one link 28, identified as subnet 10.10.12.0/24.

There are two important disadvantages of this conventional behavior:

First, all the tunnels utilize only one RPR entry link. The other two possible links via the RPR nodes 16, 22 remain unused.

Second, the tunnels are configured on RPR spans without minimum hop ring entry awareness. For example, if a tunnel were to be established so as to reach the RPR node 20, it would have been preferred that the tunnel be configured dynamically via the RPR node 22 as an entry point, instead of the RPR node 14. Configuring the tunnel via the RPR node 22 would result in minimum RPR span utilization. This is apparent from the topology of the RPR subnet 12, wherein two RPR spans are required to reach the RPR node 20 from the RPR node 14, a first span connecting the RPR node 14 to the RPR node 22, and a second span connecting the RPR node 22 to the RPR node 20. Only one RPR span is required to reach the RPR node 20 from the RPR node 22. OSPF is not aware of the topology of the RPR subnet 12, and simply sees it as one layer-2 network. OSPF in conventional operation is thus unable to optimally route IP packets to each RPR network element with the number of RPR spans minimized, and therefore cannot configure a signaled MPLS tunnel via the shortest path through the layer-2 structure. In this sense, OSPF has no layer-2 visibility.

Considering outbound traffic from the RPR subnet 12 to external routers and networks, such as the network 24, the same exit point for a particular destination network is utilized in conventional operation, regardless of the originating node of the RPR subnet 12. This is due to the fact that when OSPF constructs its internal database, three alternatives for the exit point, the RPR nodes 14, 16, 22, are considered. Assuming that the cost from each exit point (i.e., the RPR nodes 14, 16, 22) to the destination network 24 (30.30.30.0/24) is equal, each of the elements of the RPR subnet 12 will construct its routing table so that the same exit point is always chosen to that destination, without considering the number of RPR spans utilized to reach the chosen exit point, for example, the RPR nodes 16, 18, 20 will all have the following entry in their routing tables: 10.10.10.10, as shown in Table 3.

TABLE 3

| Destination network | Destination mask | Next hop IP | Cost to destination |
|---|---|---|---|
| 30.30.30.0 | 255.255.255.0 | 10.10.10.10 | 120 + Y |

In Table 3, the cost factor in the routing table entry from the RPR subnet 12 to the network 24 (30.30.30.0) is 120+Y, where Y is the cost to the destination in the IP/MPLS network beyond the IP/MPLS node 26 (NEa).

In one aspect of the invention, the inventors have discovered how to overcome the above-mentioned disadvantages by manipulating the costs associated with different RPR nodes, so as to cause the routing tables of external layer-3 network elements, such as the IP/MPLS node 26 and other external routers (not shown), to point to different RPR-IP host address in the RPR subnet 12 via different entry points into the RPR ring. This technique can be used to cause virtual tunnels to be created dynamically, and other routing paths to utilize all existing entry links to the RPR subnet 12. The costs are typically manipulated using a metric that favors signaled LSP tunnels and other paths that cover the minimum number of hops (or least incur minimum cost) from the entry point to the desired RPR node.

In another aspect of the invention, the same cost manipulation causes the host routing tables of the RPR nodes 14, 16, 18, 20, 22 in the RPR subnet 12 to select different respective RPR ring exit nodes for outbound IP traffic intended for the same destination network. The exit point that is selected for the RPR nodes 14, 16, 18, 20, 22 is based on minimum cost, taking into consideration the number of RPR spans required to reach the exit node.

In the detailed examples given below, the metric is defined in such a way that the route selected is the one with the lowest metric score. Alternatively, many different metrics can be defined. For example, the metric may be defined so that the dynamic selection of ingress and exit points could be responsive to a maximum value of the metric.

Ingress Routing.

Reference is now made to FIG. 2, which is a flow diagram illustrating a method of obtaining ingress to a layer-2 subnet having a ring topology from a layer-3 network at different entry points in accordance with a disclosed embodiment of the invention. The subnet is a RPR subnet in the current embodiment, but could be other types of subnets having a ring topology. The method relies on addition of each RPR node's RPR—IP address (or alternatively, the node's IP loopback address) to the node's OSPF host table as defined by OSPF Version 2, Appendix C.7, and assigning a manipulated cost that is relative to the number of layer-2 RPR spans. The loopback address is a virtual IP address assigned to the RPR node, as distinguished from the RPR—IP address, which is assigned to the RPR interface. In some embodiments, signaling could be directed to the RPR—IP or the loopback IP address. Furthermore, the assigned relative cost is derived from the RPR reference topology, as defined in the above-noted IEEE standard 802.17. That is, each RPR node has a constructed RPR reference topology that specifies all other ring nodes, and their relative position within the RPR ring, i.e., the number of spans. The cost factor is based on the number of RPR spans between the RPR node and the entry point to the ring. The process steps that follow are shown with reference to a single RPR node. However, all RPR nodes in the ring that have at least one external MPLS link normally execute the process steps shown below independently and concurrently.

At initial step 30, a RPR node of a RPR subnet examines its configuration with respect to the subnet topology.

Control passes immediately to decision step 32, where the current node, chosen in initial step 30, determines if it has at least one IP external interface (e.g., the interface 10.10.12.1/24 of the RPR node 14 (FIG. 1)).

If the determination at decision step 32 is negative, then control proceeds to final step 34, which is described below.

If the determination at decision step 32 is affirmative, then at step 36 the current node updates its host routing table (OSPF Version 2, Appendix C.7) with all other mate RPR-IP nodes in the ring based on the RPR reference topology. This table indicates what hosts are directly attached to a router, and what metrics and types of service should be advertised for them. In embodiments employing OSPF Version 2, details of the host routing table are given in Appendix C.7 (RFC 2328) of the above-noted OSPF specification. All RPR host addresses that are specified in the RPR reference topology are added to the host routing table. The reference topology is updated with all IP RPR addresses within the RPR ring. For example, in FIG. 1, the RPR node 14 (NEb) has its RPR reference topology updated with IP addresses 10.10.10.10, 10.10.10.11, 10.10.10.12, 10.10.10.13, 10.10.10.14. Once updated in the OSPF host table, each host IP address (except for IP address of the RPR node 14) is advertised, as a 32-bit mask.

Next, at step 38, each entry of the OSPF host table is updated to indicate the OSPF area to which the RPR node belongs.

Next, at step 40, each entry added in step 36 is specified by a cost metric. In one embodiment, the metric is based on the following formula $$COST_m = K1 * \#OfHopsToNode'sIpAdd + K2. \quad (1)$$

K1 and K2 may be calculated as $$K1 = \frac{CostConfiguredOnRprIpInterface}{\#OfNodesInReferenceTopology}, \quad (2)$$

and K2=1. Alternatively, other values of K1, K2 may be calculated, wherein in Equation 1 and Equation 2:

CostConfiguredonRprIpInterface is the actual cost configured by the operator on the IP interface of the RPR. For example, in each of the RPR nodes shown in FIG. 1, the cost is 20.

ofNodesInReferenceTopology is the number of nodes in the RPR ring, as listed in the node's reference topology. For example, the number of nodes in the RPR subnet 12 (FIG. 1) is five.

OfHopsToNode'sIpAdd is the number of RPR spans from the current node to the given destination node for the present entry, as indicated in the RPR reference topology via the shortest route (i.e., outer or inner ringlet direction). For example, in FIG. 1, if the current node is the RPR node 14, and the destination node for this entry is the RPR node 18 (IP address 10.10.10.12 in the OSPF host table), then #OfHopsToNode'sIpAdd=2.

The operator "*" represents multiplication.

Equation 1 and Equation 2 are representative of a formula for calculating a cost factor. Many alternative metrics and formulas can be applied in step 40.

Next, at step 42 entries in the OSPF host table are flooded in the current OSPF area using router LSA packets. This step updates all external routers as well as all RPR nodes with the new entries. This step will cause the OSPF database to be synchronized in all participating OSPF areas.

At step 44 all external routers, such as the IP/MPLS node 26 (FIG. 1) are informed by the router LSA packets that were transmitted in step 42 that there is a new route to the advertised hosts in the RPR subnet.

Alternatively, advertising may be achieved using external LSA advertising as specified in OSPF Version 2, Section 12, *Link State Advertisements*. In this advertising method, each RPR node is added to the external LSA database with a 32-bit mask. Cost is calculated as described above, using Equation 1. Furthermore, although the embodiments described herein make use of OSPF, the methods of the present invention may similarly be adapted for use with other routing and control protocols.

In either case, external routers now evaluate alternate paths to the nodes of a RPR subnet, based on the OSPF database updates that they received at step 42. Referring again to the example of FIG. 1, the IP/MPLS node 26 now sees four possible new paths to the RPR node 20 (RPR IP address 10.10.10.13/24):

1. Via the RPR node 14 (10.10.12.0) with cost, calculated using Equation 1 as 100+COSTm (of the RPR node 14): 100+COSTm=100+9=109;
2. Via the RPR node 22 (10.10.13.0) with cost of 100+COSTm=100+5=105;
3. Via the RPR node 16 (10.10.11.0) with cost of 100+COSTm=100+9=109; and
4. Via the link 28 and the RPR node 14 (10.10.12.0) with cost 100+20=120 (this is a route to network 10.10.10.0)

Control now proceeds to final step 34, where a route to the RPR node is chosen. Typically, the external router will choose the path with a lowest cost. In the embodiment shown in FIG. 1, the selected path has the minimum number of hops. In still other embodiments, the cost factor is used to arbitrate among different paths all having the minimum number of hops. In the example of FIG. 1, in the current embodiment, the route chosen is via the RPR node 22 (10.10.13.0). This path, as seen in the example of FIG. 1, consumes the minimum number of layer-2 hops within the RPR ring.

Egress Routing.

The OSPF standard allows multiple equal-cost paths to exist to a destination, having different next hop addresses. Referring again to the example of FIG. 1, the RPR node 18 (NEd) has three different exit points from the RPR subnet 12, the RPR nodes 14, 16, 22. Each exit point is represented by a different next hop IP address entry in the OSPF routing table. Conventionally, the RPR node 18 would see each exit point as having the same cost 20 (the cost of the RPR interface). According to an embodiment of the present invention, however, the cost to each exit point is adjusted based on the number of RPR spans from the RPR node 18 to each exit point, in a manner similar to that described above with reference to FIG. 2. This results in different paths leading to the layer-3 network 24 having non-equal costs, depending on the different numbers of layer-2 RPR spans needed to exit from the RPR subnet 12 on each path. Typically, each node selects the path having the minimum total cost. As in ingress routing, the egress routing is disclosed with respect to a RPR subnet. However, the principles of this aspect of the invention are applicable to layer-2 subnets having ring topologies other than RPR subnets.

Reference is now made to FIG. 3, which is a flow diagram illustrating a method of obtaining egress from a layer-2 subnet into a layer-3 network at different exit points in accordance with a disclosed embodiment of the invention. This method may be carried out simultaneously and in conjunction with the method of FIG. 2. The process steps that follow are shown with reference to a single RPR node. However, all RPR nodes in a ring normally execute the process steps shown below independently and concurrently.

At initial step 46, a RPR node of the RPR subnet examines its OSPF routing table and selects groups consisting of at least two table entries. Each entry of a given group corresponds to a specific destination network, and involves more than one next hop to the destination network. This and the steps that follow apply not only to OSPF, but also to other routing protocols that support equal multi-path routing tables. Again, as in the flow chart presented in FIG. 2, the process shown in FIG. 3 is performed simultaneously for all RPR nodes. For example, in FIG. 1, each RPR node would have three entries in its OSPF routing table to a specific destination network, assuming that the cost from each exit point (the RPR nodes 14, 16, 22) to the specific destination network is equal.

Next, at step 48, the RPR node updates its routing table. Entries (corresponding to routes) that were selected in initial step 46, are cost adjusted in accordance with Equation 1 and Equation 2.

Next, at step 50, the routes adjusted in step 48 are analyzed by the RPR node.

Next, at final step 52 an optimum path from the RPR node to an external node via an exit point of the RPR subnet is chosen. The metric enables the nodes of the ring to choose the best egress node for each external address. This is done in the same manner as in final step 34 (FIG. 2). The details are not repeated in the interest of brevity. Thereupon the procedure ends.

It will be appreciated by persons skilled in the art that the present invention is not limited to what has been particularly shown and described hereinabove. Rather, the scope of the present invention includes both combinations and subcombinations of the various features described hereinabove, as well as variations and modifications thereof that are not in the prior art, which would occur to persons skilled in the art upon reading the foregoing description.

The invention claimed is:

1. A method for obtaining ingress to a layer-2 ring network to reach nodes thereof, said nodes including ingress nodes that couple said ring network to an external layer-3 network, the method comprising the steps of:
   in said ingress nodes, creating entries in a host table, each of said entries comprising an address of a respective one of said nodes of said ring network and a metric determined responsively to a topology of said ring network;
   thereafter uploading said host table to external elements of said layer-3 network;

defining paths from said external elements to designated ones of said nodes of said ring network, by selecting one of said ingress nodes for each of said paths responsively to said metric; and transmitting data from network elements that are external to said ring network to at least one of said nodes via a selected one of said paths.

2. The method according to claim 1, wherein said ring network is a RPR subnet.

3. The method according to claim 1, wherein said ingress nodes are selected responsively to a minimum value of said metric.

4. The method according to claim 1, wherein said ingress nodes are selected responsively to a maximum value of said metric.

5. The method according to claim 1, wherein said step of defining paths is performed in each of one or more of said external elements.

6. The method according to claim 1, wherein said step of defining paths comprises dynamically defining virtual tunnels.

7. The method according to claim 1, wherein said layer-3 network is an IP network, and wherein said step of uploading comprises flooding router LSA's with a mask.

8. The method according to claim 7, wherein said step of flooding comprises flooding stub networks.

9. The method according to claim 7, wherein said mask is a 32-bit mask.

10. The method according to claim 1, wherein said step of uploading comprises external LSA advertising to said layer-3 network.

11. The method according to claim 1, wherein said metric comprises a cost factor that is computed between one of said ingress nodes and said respective one of said nodes.

12. The method according to claim 11, wherein said cost factor varies with a number of layer-2 spans between said one ingress node and said respective one of said nodes.

13. The method according to claim 11, wherein said step of defining paths comprises computing a total cost based on said cost factor and on interface costs that are assigned in said layer-3 network, and selecting said paths so as to minimize said total cost.

14. The method according to claim 1, wherein said metric is determined responsively to a number of hops between said ingress nodes and said respective one of said nodes.

15. The method according to claim 14, wherein said ingress nodes are configured with an interface cost on said layer-3 network, and wherein said metric is determined proportionally to said interface cost and to said number of hops.

16. The method according to claim 14, wherein said ingress nodes are configured with an interface cost on said layer-3 network, and wherein said metric is determined by said interface cost divided by said number of hops.

17. A computer software product, including a computer-readable medium in which computer program instructions are stored, which instructions, when read by a computer, cause the computer to perform a method for obtaining ingress from an external layer-3 network to a layer-2 ring network to reach nodes thereof, comprising the steps of:

configuring ingress nodes of said ring network to create entries in a host table, each of said entries comprising an address of a respective one of said nodes of said ring network and a metric;

configuring said ingress nodes to thereafter upload said host table to external elements of a data network that interfaces with said ring network via said ingress nodes;

configuring said external elements to define paths from said external elements to designated ones of said nodes of said ring network, each of said paths leading through a selected one of said ingress nodes responsively to said metric; and transmitting data from network elements that are external to said ring network to at least one of said nodes via a selected one of said paths.

18. The computer software product according to claim 17, wherein said ring network is a RPR subnet.

19. The computer software product according to claim 17, wherein said ingress nodes are selected responsively to a minimum value of said metric.

20. The computer software product according to claim 17, wherein said ingress nodes are selected responsively to a maximum value of said metric.

21. The computer software product according to claim 17, wherein said paths are virtual tunnels.

22. The computer software product according to claim 17, wherein said ingress nodes are configured to upload said host table by flooding router LSA's with a mask.

23. The computer software product according to claim 22, wherein flooding comprises flooding stub networks.

24. The computer software product according to claim 22, wherein said mask is a 32-bit mask.

25. The computer software product according to claim 17, wherein said ingress nodes are configured to upload said host table by external LSA advertising to said data network.

26. The computer software product according to claim 17, wherein said metric comprises a cost factor that is computed between one of said ingress nodes and said respective one of said nodes.

27. The computer software product according to claim 26, wherein said cost factor varies with a number of layer-2 spans between said one ingress node and said respective one of said nodes.

28. The computer software product according to claim 26, wherein said paths are defined by computing a total cost based on said cost factor and on interface costs that are assigned in said layer-3 network, and selecting said paths so as to minimize said total cost.

29. The computer software product according to claim 17, wherein said metric comprises a number of hops between said ingress nodes and said respective one of said nodes.

30. The computer software product according to claim 29, wherein said ingress nodes are configured with an interface cost on said layer-3 network, and wherein said metric is determined proportionally to said interface cost and to said number of hops.

31. The computer software product according to claim 29, wherein said ingress nodes are configured with an interface cost on said layer-3 network, and wherein said metric is determined by said interface cost divided by said number of hops.

32. A network routing system for obtaining ingress from an external layer-3 network to a layer-2 ring network to reach nodes thereof, comprising:

first routers disposed in ingress nodes of said ring network, said first routers being configured for creating entries in a host table, each of said entries comprising an address of a respective one of said nodes of said ring network and a metric; said first routers being further configured for uploading said host table to external elements of a data network that interfaces with said ring network via said ingress nodes; a second router disposed in at least one of said external elements, said second router being configured for defining paths from said external elements to designated ones of said nodes of said ring network, each of said paths leading through a selected one of said ingress nodes responsively to said metric; and transmitting data from network elements that are external to said ring network to at least one of said nodes via a selected one of said paths.

33. The network routing system according to claim 32, wherein said ring network is a RPR subnet.

34. The network routing system according to claim 32, wherein said ingress nodes are selected responsively to a minimum value of said metric.

35. The network routing system according to claim 32, wherein said ingress nodes are selected responsively to a maximum value of said metric.

36. The network routing system according to claim 32, wherein said paths are virtual tunnels.

37. The network routing system according to claim 32, wherein said first routers perform uploading by flooding router LSA's with a mask.

38. The network routing system according to claim 37, wherein said step of flooding comprises flooding stub networks.

39. The network routing system according to claim 37, wherein said mask is a 32-bit mask.

40. The network routing system according to claim 32, wherein said first routers perform uploading by external LSA advertising to said data network.

41. The network routing system according to claim 32, wherein said metric comprises a cost factor that is computed between one of said ingress nodes and said respective one of said nodes.

42. The network routing system according to claim 41, wherein said cost factor varies with a number of layer-2 spans between said one ingress node and said respective one of said nodes.

43. The network routing system according to claim 41, wherein said paths are defined by computing a total cost based on said cost factor and on interface costs that are assigned in said layer-3 network, and selecting said paths so as to minimize said total cost.

44. The network routing system according to claim 32, wherein said metric comprises a number of hops between said ingress nodes and said respective one of said nodes.

45. The network routing system according to claim 44, wherein said ingress nodes are configured with an interface cost on said layer-3 network, and wherein said metric is determined proportionally to said interface cost and to said number of hops.

46. The network routing system according to claim 44, wherein said ingress nodes are configured with an interface cost on said layer-3 network, and wherein said metric is determined by said interface cost divided by said number of hops.

47. A method for obtaining egress from a layer-2 ring network to an external layer-3 network, comprising the steps of:

in nodes of said ring network creating entries in a host table, each of said entries comprising an address of a respective one of said nodes of said ring network and a metric determined responsively to a topology of the ring network;

defining paths from said nodes through egress nodes of said ring network to external elements in said external layer-3 network;

selecting one of said paths responsively to said metric; and transmitting data from at least one of said nodes via said selected one of said paths to network elements that are external to said ring network.

48. The method according to claim 47, wherein said ring network is a RPR subnet.

49. The method according to claim 47, wherein said egress nodes are selected responsively to a minimum value of said metric.

50. The method according to claim 47, wherein said egress nodes are selected responsively to a maximum value of said metric.

51. The method according to claim 47, wherein said step of defining paths comprises dynamically defining virtual tunnels.

52. The method according to claim 47, further comprising the step of memorizing said paths in said host table of said nodes.

53. The method according to claim 47, wherein said metric comprises a cost factor that is computed between one of said egress nodes with said ring network and said respective one of said nodes.

54. The method according to claim 53, wherein said cost factor varies with a number of layer-2 spans between said one egress node and said respective one of said nodes.

55. The method according to claim 53, wherein said paths are defined by computing a total cost based on said cost factor and on interface costs that are assigned in said layer-3 network, and selecting said paths so as to minimize said total cost.

56. The method according to claim 47, wherein said metric comprises a number of hops between said egress nodes and said respective one of said nodes.

57. The method according to claim 56, wherein said egress nodes are configured with an interface cost on said layer-3 network, and wherein said metric is determined proportionally to said interface cost and to said number of hops.

58. The method according to claim 56, wherein said egress nodes are configured with an interface cost on said layer-3 network, and wherein said metric is determined by said interface cost divided by said number of hops.

59. A computer software product, including a computer-readable medium in which computer program instructions are stored, which instructions, when read by a computer, cause the computer to perform a method for obtaining egress from a layer-2 ring network to an external layer-3 network comprising the steps of:

in nodes of said ring network creating entries in a host table, each of said entries comprising an address of a respective one of said nodes of said ring network and a metric;

defining paths from said nodes through egress nodes of said ring network;

selecting one of said paths responsively to said metric; and transmitting data from said nodes via said selected paths to network elements that are external to said ring network.

60. The computer software product according to claim 59, wherein said ring network is a RPR subnet.

61. The computer software product according to claim 59, wherein said egress nodes are selected responsively to a minimum value of said metric.

62. The computer software product according to claim 59, wherein said egress nodes are selected responsively to a maximum value of said metric.

63. The computer software product according to claim 59, wherein said step of defining paths comprises dynamically defining virtual tunnels.

64. The computer software product according to claim 59, further comprising a step of memorizing said paths in said host table of said nodes.

65. The computer software product according to claim 59, wherein said metric comprises a cost factor that is computed between one of said egress nodes with said ring network and said respective one of said nodes.

66. The computer software product according to claim 65, wherein said cost factor varies with a number of layer-2 spans between said one egress node and said respective one of said nodes.

67. The computer software product according to claim 65, wherein said paths are defined by computing a total cost based on said cost factor and on interface costs that are assigned in said layer-3 network, and selecting said paths so as to minimize said total cost.

68. The computer software product according to claim 59, wherein said metric comprises a number of hops between said egress nodes and said respective one of said nodes.

69. The computer software product according to claim 68, wherein said egress nodes are configured with an interface cost on said layer-3 network, and wherein said metric is determined proportionally to said interface cost and to said number of hops.

70. The computer software product according to claim 68, wherein said egress nodes are configured with an interface cost on said layer-3 network, and wherein said metric is determined by said interface cost divided by said number of hops.

71. A network routing system for obtaining egress from a layer-2 ring network to an external layer-3 network comprising:
a plurality of routers disposed in nodes of said ring network, said routers being configured for creating entries in a host table, each of said entries comprising an address of a respective one of said nodes of said ring network and a metric, said routers being further configured for defining paths from said nodes through egress nodes of said ring network, for selecting one of said paths responsively to said metric; and for transmitting data from said nodes via said selected paths to network elements that are external to said ring network.

72. The network routing system according to claim 71, wherein said ring network is a RPR subnet.

73. The network routing system according to claim 71, wherein said egress nodes are selected responsively to a minimum value of said metric.

74. The network routing system according to claim 71, wherein said egress nodes are selected responsively to a maximum value of said metric.

75. The network routing system according to claim 71, wherein said paths are dynamic virtual tunnels.

76. The network routing system according to claim 71, wherein said paths are stored in said host table.

77. The network routing system according to claim 71, wherein said metric comprises a cost factor that is computed between one of said egress nodes with said ring network and said respective one of said nodes.

78. The network routing system according to claim 77, wherein said cost factor varies with a number of layer-2 spans between said one egress node and said respective one of said nodes.

79. The network routing system according to claim 77, wherein said paths are defined by computing a total cost based on said cost factor and on interface costs that are assigned in said layer-3 network, and selecting said paths so as to minimize said total cost.

80. The network routing system according to claim 71, wherein said metric comprises a number of hops between said egress nodes and said respective one of said nodes.

81. The network routing system according to claim 80, wherein said egress nodes are configured with an interface cost on said layer-3 network, and wherein said metric is determined proportionally to said interface cost and to said number of hops.

82. The network routing system according to claim 80, wherein said egress nodes are configured with an interface cost on said layer-3 network, and wherein said metric is determined by said interface cost divided by said number of hops.

83. A method for routing data through a layer-2 ring network, said ring network having interface nodes with external network elements of a data network and non-interface nodes, comprising the steps of:
in said interface nodes of said ring network creating first entries in a first host table, each of said first entries comprising an address of a respective one of said non-interface nodes and a first metric;
thereafter uploading said first host table to said external network elements; and
using said first host table identifying optimum ingress paths from said external network elements to said non-interface nodes, each of said ingress paths leading through one of said interface nodes responsively to said first metric;
in said non-interface nodes of said ring network creating second entries in a second host table, each of said second entries comprising an address of a respective one of said interface nodes and a second metric;
using said second host table identifying optimum egress paths from said non-interface nodes through different ones of said interface nodes of said ring network, responsively to said second metric; and
transmitting data to and from said ring network via said ingress paths and said egress paths.

84. The method according to claim 83, wherein said ring network is a RPR subnet.

\* \* \* \* \*